(12) United States Patent
Cadorette, Jr. et al.

(10) Patent No.: US 6,341,169 B1
(45) Date of Patent: Jan. 22, 2002

(54) SYSTEM AND METHOD FOR EVALUATING A DOCUMENT AND CREATING A RECORD OF THE EVALUATION PROCESS AND AN ASSOCIATED TRANSACTION

(75) Inventors: Normand G. Cadorette, Jr., New York; Jonathan E. Vall, East Hampton; Miguel R. Arcentales, Rockaway, all of NY (US)

(73) Assignee: Pulse Systems, Inc., East Hampton, NY (US)

( * ) Notice: Subject to any disclaimer, the term of this patent is extended or adjusted under 35 U.S.C. 154(b) by 0 days.

(21) Appl. No.: 09/246,261

(22) Filed: Feb. 8, 1999

(51) Int. Cl.$^7$ ............................................. G06K 9/100
(52) U.S. Cl. .................................... 382/115; 340/5.8
(58) Field of Search ............................. 382/115, 116, 382/118; 235/375, 379, 380, 382, 470, 492; 704/246, 273; 902/3, 4, 25; 705/1, 26, 42–45, 64, 75; 356/71

(56) References Cited

U.S. PATENT DOCUMENTS

| | | | |
|---|---|---|---|
| 5,159,646 A | 10/1992 | Kumagai | 382/225 |
| 5,337,358 A | 8/1994 | Axelrod et al. | 705/75 |
| 5,416,306 A | 5/1995 | Imahata | 235/380 |
| 5,432,864 A | 7/1995 | Lu et al. | 382/118 |
| 5,469,506 A | 11/1995 | Berson et al. | 713/186 |
| 5,509,083 A | 4/1996 | Abtahi et al. | 382/124 |
| 5,577,120 A | 11/1996 | Penzias | 705/64 |
| 5,581,630 A | 12/1996 | Bonneau, Jr. | 382/116 |
| 5,642,160 A | 6/1997 | Bennett | 348/156 |
| 5,657,389 A | 8/1997 | Houvener | 713/186 |
| 5,679,938 A | 10/1997 | Templeton et al. | 235/379 |
| 5,742,685 A | 4/1998 | Berson et al. | 713/186 |
| 5,754,675 A | 5/1998 | Valadier | 382/115 |
| 5,790,674 A | 8/1998 | Houvener et al. | 713/185 |
| 5,799,092 A | 8/1998 | Kristol et al. | 380/51 |
| 5,802,199 A | 9/1998 | Pare, Jr. et al. | 382/115 |
| 5,818,023 A | 10/1998 | Meyerson et al. | 235/470 |
| 5,818,955 A | 10/1998 | Smithies et al. | 382/115 |
| 6,145,738 A | * 11/2000 | Stinson et al. | 235/379 |

FOREIGN PATENT DOCUMENTS

| | | |
|---|---|---|
| EP | 0859488 A2 | 8/1998 |
| GB | 2256170 A | 2/1992 |
| WO | WO 97/15032 | 4/1997 |
| WO | WO 98/35298 | 8/1998 |
| WO | WO 98/50875 | 11/1998 |

OTHER PUBLICATIONS

*1998 I.D. Checking Guide* by Drivers License Guide Company.
"Polaroid & Visionics Tout Face Recognition to DMVs" CNNfN, Apr. 16, 1998.

* cited by examiner

Primary Examiner—Samir Ahmed
(74) Attorney, Agent, or Firm—Michael J. Brown (57) ABSTRACT

A system for evaluating a document for the purpose authorizing an individual presenting the document for a transaction. The system comprises means for acquiring data from the document presented by the individual and for acquiring biometric data characteristics of the individual at the time of the transaction. The system uses data processing means to compare the acquired data to reference data stored in databases containing records corresponding to various types of documents and records characterizing the individuals to whom documents were issued. The system retrieves the biographical information corresponding to the individual seeking authorization and determines whether the information indicates that the individual is eligible for the transaction. The system stores information identifying authorization attempts and information identifying associated transaction. The invention additionally comprises a method following the stated functions of the system.

17 Claims, 5 Drawing Sheets

FIGURE 1

EXAMPLE CREDENTIAL EVALUATION PROTOCOL

SYSTEM AND METHOD FOR EVALUATING A DOCUMENT AND CREATING A RECORD OF THE EVALUATION PROCESS AND AN ASSOCIATED TRANSACTION

FIELD OF THE INVENTION

The present invention relates to the fields of document evaluation, identity verification and transaction authorization. The invention aims particularly to facilitate the evaluation of identification documents as employed in the context of retail or wholesale sales or other types of transactions or security and access functions in commercial, industrial, financial, governmental, medical, legal or other service or product fields. The invention is directed toward relieving an evaluating party of the subjective aspects of the evaluation process and creating a record of compliance with a prescribed document validation and identity verification protocol.

BACKGROUND OF THE INVENTION

There are many scenarios in which one individual is required to present a credential, identification document or another instrument of any of the types collectively referred to or commonly known as ID, to another individual for evaluation. The evaluating party (evaluator) uses the credential for the purpose of establishing whether the presenting party (the presenter or the subject, ostensibly the individual identified by the credential) is eligible for a requested transaction. Commonly, the age of the presenter as indicated by the credential determines eligibility. In all of the scenarios the evaluator must determine the validity of the credential itself and verify that the presenter is the individual identified by the credential.

In one type of scenario store clerks are required to demand and evaluate state-issued or other official photo credential from prospective purchasers of tobacco or alcohol. In such scenarios clerks are responsible for enforcing the prohibition of sales of a controlled product to parties of less than a minimum age. Clerks must manually inspect presented photo credentials for obvious alterations or other incriminating flaws attempting to determine whether or not the credential is valid while subjectively comparing the small photographic image on the credential with the presenter attempting to verify that the presenter is the person in the image and mentally computing the age of the presenter from the date of birth printed on the credential. In instances where the presenter provides a false or altered credential which is accepted as valid and verified by the clerk, prohibited transactions can result.

In some cases clerks may employ aids including specially designed calendars, lamps, magnetic stripe readers, barcode readers or other devices to assist in evaluating official credentials. Alternatively, the clerk may use these types of aids to assist in evaluating proprietary credentials. In these instances the systems employed are usually capable of supporting only one type of credential.

Such prior art aids do not relieve the clerk or other evaluating party of the responsibility of subjectively assessing raw biometric information, such as the presenter's face or signature, and comparing the raw biometric data to reference data in the form of a photographic image or an image of a signature, as incorporated in the credential. There has not been provided a means for reviewing whether or not the evaluator made an accurate evaluation or even if an evaluation has been performed at all.

Houvener, in U.S. Pat. No. 5,657,389, discloses an identity verification system which stores photographic images in a database and retrieves said photographic images upon request. However, Houvener only provides for the rendition of these images by the identity verification system, relying upon a human operator to perform a comparison of the stored photographic image to the physical appearance of an individual before the operator.

Prior art such as Houvener's provides a secure and reliable reference for evaluators to use in the context of credit card transactions or other transactions utilizing proprietary credentials tailored to a particular type of transaction. However, such systems are not well suited for the problem of evaluating credentials for the vast number of transactions conditioned on the presentation and evaluation of a relatively unrestricted variety of drivers licenses or other non-proprietary credential types.

A drawback of previous systems is that these systems must establish a communications link between a terminal and a remote database server each time reference data is needed, delaying the transaction in progress. Moreover, such systems cannot operate independently of the remote server and provide no alternate means of performing an evaluation.

Significantly, prior art systems provide no comprehensive record of the evaluation process or particular evaluation events and their connections to specific purchases of specific products. Ideally, systems directed to the enforcement of sales prohibitions would irrefutably associate a credential with its presenter and with the item(s) purchased. The problem of enforcing age restrictions on the sale of controlled products is therefore not addressed by the prior art systems.

Additionally, by providing a record of transactions, many purposes such as market research, marketing and consumer relations among others, can be addressed by the disclosed system which cannot be addressed by prior art systems.

Prior art systems are relatively inflexible and unable to readily accommodate advances in biometric identification technology as they arise.

OBJECTS OF THE INVENTION

In accordance with the stated field and background it is an object of the present invention to provide a system and method which programmatically validates a credential, or identification document, and verifies the credential by verifying that the individual presenting the credential is the individual identified by the credential. The object is to automatically evaluate the credential as it is presented at a point of evaluation in a wide range of contexts in order to detect fraudulent credentials and thereby preventing attempted fraud on the part of the credential presenter.

A subordinate object of the present invention is to provide a system and method of automatically comparing official data, defining the characteristics of various types of credentials, with data extracted from an image of a credential or with data encoded on or embedded within a credential under evaluation, to establish a reliable measure of whether the data match and therefore whether the credential is recognized and its type identified, thereby validating the credential.

Another subordinate object of the present invention is to provide a system and method for automatically comparing an official archived photographic image or other biometric identifier of the individual identified by a credential with an image or other biometric measure of the credential presenter captured at the time and place of evaluation. The object is to establish a reliable measure of whether the identifiers match and therefore whether the credential presenter is recognized and verified as the individual identified by the credential thereby verifying the credential.

Another object of the present invention is to provide a system and method for automatically determining the age of a presenter of a credential.

A defining object of the present invention is to provide a system and method for establishing and facilitating an explicit protocol for evaluating a credential. The inventors propose a system which effects any protocol consisting of procedures for validation and verification employing combinations of automatic (performed by the system) and manual (performed by the operator) functions consistent with and programmed according to a given credential evaluation scenario, the type(s) of credential(s) anticipated in the scenario and the specific features of the system configuration, its processing capabilities, the biometric technology employed and the extents of available reference databases.

A related object of the present invention is to provide a system and method for automatically monitoring and thereby encouraging and enforcing compliance with an explicit protocol for evaluating a credential.

A further related object of the present invention is to provide a system and method for automatically documenting a credential evaluation event by recording the data collected, the results of the evaluation and the information identifying the credential presenter according to an explicit protocol for evaluating a credential.

Still another object of the present invention is to provide a system and method for automatically documenting a transaction associated with a credential evaluation event by recording information about the transaction according to an explicit protocol for authorizing a transaction.

An additional object of the present invention is to provide a system and method for automatically detecting discrepancies between text printed on a credential and data encoded on or embedded within the credential, or between text printed on a credential text and official reference data thereby detecting fraudulent credentials.

An ultimate object of the present invention is to reduce and eventually eliminate the subjective aspects of the credential evaluation process.

Another object of the present invention is to provide a system and method for recognizing individuals whose credentials have been previously validated and verified thereby eliminating the need for the individuals to present their credentials and automatically approving them for an associated transaction.

A general object of the present invention is to provide a system and method for evaluating credentials which utilizes local databases stored at the point of evaluation. The object is to eliminate the necessity for establishing a communications link with an external remote database for each evaluation event or transaction.

Another general object of the present invention is to provide a system and method which is capable of capitalizing on continuing advances in computer hardware and software technology and serving as a platform for the employment of a multitude of biometric identification mechanisms in a variety of credential evaluation scenarios.

Still another object of the present invention is to provide a system and method which deters potential violators of age-access laws.

Yet another object of the present invention is to provide a system and method for monitoring sales transactions involving controlled products. The inventors envision specifying a protocol which includes the capture of information identifying products sold and the storage of the captured information in transaction event records which associate credentials with their presenters and with products purchased.

An associated object of the present invention is to provide a means by which data from a multitude of evaluation points can be gathered, processed and analyzed to provide a comprehensive record of the movement of controlled products within a monitored domain.

These and still other objects of the present invention are disclosed in the following description.

SUMMARY OF THE INVENTION

The present invention is a system and method for automatically evaluating credentials, documenting the evaluation process and recording the intermediate and ultimate results of the process with details of an associated transaction. In the course of an evaluation event the system validates the credential presented, verifies that the presenter is the individual identified by the credential and indicates whether the presenter is eligible for the associated transaction. The system performs the evaluation function in a flexible way employing the hardware in an appropriate and optimal fashion as specified by a programmed evaluation protocol.

The system comprises one or more evaluation stations either operating independently or in conjunction with an administrative station. Evaluation stations operating in conjunction and communicating with the associated administrative station form a Credential Evaluation Network. The system optionally comprises a multitude of Credential Evaluation Networks communicating with each other via connections between and among the administrative stations forming an Expanded Credential Evaluation Network.

An evaluation station, located and employed at a point of evaluation, comprises a computer or other processing device with associated hardware and software components for capturing, processing and storing optically scanned images of credentials presented for evaluation and optical images of the credential presenters. The evaluation station also comprises components for capturing, processing and storing additional data encoded in, on or attached to a credential. The evaluation station also comprises additional or alternate biometric measurement devices according to the evaluation scenario. Additionally, the evaluation station comprises autonomous secure databases with software for comparing captured data to data from reference databases and for storing records of evaluations and transactions in event databases. The evaluation station also comprises a device or devices for detecting and reporting the products associated with a transaction to provide product information for inclusion in transaction event records. The evaluation station comprises components for securely communicating with an administrative station. Finally, the evaluation station comprises a means by which operators can manually add or edit data or signal the system in the course of the evaluation process.

An administrative station, located and employed at a central administrative location, comprises a computer or computers or other processing device(s) with associated hardware and software components for compiling and maintaining reference databases. The administrative station incorporates components for securely communicating with its network of evaluation stations and optionally with other administrative stations or external data sources. The administrative station utilizes the communication components for transmitting reference data, administrative commands and administrative request responses to evaluation stations as well as for receiving evaluation and transaction data, administrative requests and command responses from evaluation stations. The administrative station also comprises components for analyzing evaluation and transaction event data for generating reports of system usage.

The system automatically validates a credential by collecting and analyzing data according to a programmed protocol for comparing an optical image of the credential with data from a local reference database. The system employs image processing software algorithms to detect characteristic features of the credential and compare the detected features with database records describing the features of numerous registered types of credentials. If the system finds a match between the detected features and the features of a registered credential type the credential is accepted as valid.

The system automatically verifies a validated credential by capturing and processing an optical image of the presenter or capturing and processing other types of biometric data according to a programmed protocol for comparing captured biometric data with corresponding official identifying biometric data from a local reference database. The system employs biometric software algorithms to detect characteristic biometric features of the credential presenter and compare the detected features with a database record of the characteristic biometric features of the individual identified by the credential. If the system finds a match between the detected features and the features of the subject of the credential, the credential is accepted as verified.

The system guides the operator through a series of manual evaluation steps according to a programmable manual evaluation protocol in the event that the system cannot automatically validate or verify the credential or in the event that the operator selects to perform the manual evaluation when given the option to do so.

The system creates and stores an evaluation event record at the conclusion of an evaluation.

If a credential is verified by the system and the presenter is determined to be eligible for the associated transaction then the system prompts the operator to complete the transaction and enter any additional information to be included in a transaction event record.

DETAILED DESCRIPTION OF THE INVENTION

The present invention is a system and method for providing a broadly applicable, secure and reliable automatic means of evaluating documents. The system is specifically targeted to evaluating identification documents or credentials of any of numerous different types variously and collectively known as ID or individually referred to as an ID. The system objectively compares credential image data and biometric data of various types, as collected at a point of evaluation from the credential presenter or from the credential itself, with certified reference records of corresponding credential format and content data and biometric data from the files of the credential issuer. The system eliminates the subjective responsibility of a human credential evaluator deferring the process to an impartial entity employing objective technical means.

The system operates under the premise that the only truly valid age and biometric data are that on file with the credential issuing agency, not that embodied in the physical credential. The system employs hardware and software means for converting the data on file with a multitude of credential issuing agencies into forms suitable for use as reference for the automatic comparison functions implemented by the system.

The primary functional element of the system is the evaluation station. The evaluation station may exist in a variety of physical form factors according to mechanical, ergonomic, electrical and electronic considerations consistent with particular credential evaluation scenarios. Various embodiments of an evaluation station may incorporate some or all of the disclosed features and other features (internally or peripherally, including security, administrative, biometric and others pending advances in the arts) not disclosed. Different embodiments may be tailored to operate in an unattended manner in which the credential presenter acts as the operator utilizing alternate hardware, software, administrative and operational functionality not described for the particular embodiment disclosed here. All embodiments of the invention capitalize on the software and hardware capability, capacity and flexibility of current and future computer and biometric technology. The invention as disclosed employs Optical Facial Recognition (OFR) and Optical Character Recognition (OCR) software and hardware pertinent to the problem of evaluating credentials. The invention anticipates advances in biometric and image processing software and hardware and is designed to accommodate such advances as they arise. The invention relies on collaboration among evaluating entities and credential issuing agencies to establish and maintain sufficiency, accessibility and currency of the reference data for recognized credential types. The invention also anticipates that collaboration between evaluating entities and credential issuing agencies will generate any necessary convergence between system and protocol design and operational and performance imperatives.

For the purposes of this description, the term "evaluation" refers to the process of validating and verifying a credential. The phrase "evaluation event" refers to a single instance of the presentation and evaluation of a credential. The phrase "credential owner" refers to the individual duly authorized to possess the credential which identifies the individual whether or not that individual actually owns the credential. A credential is said to be validated if the system or the operator determine that the instrument itself is a valid indicator of identity. A credential is said to be verified if it was validated and subsequently determined by the system or the operator to identify its presenter.

A master evaluation protocol specifies all the actions to be taken and procedures to be performed in the course of an evaluation as well as the rules governing whether the evaluation is successful. A programmed evaluation protocol specifies and implements those actions to be taken, procedures to be performed by the system and the rules to be satisfied, either autonomously or in concert with an operator, as its part of a master evaluation protocol. A master evaluation protocol specifies the manner in which the system hardware is employed, the input, output, communication and processing procedures to be used, the particular data to be extracted, processed, generated, transmitted, accessed, compared and stored, the formats of the data and the formats of the databases in which the data are recorded. The invention is disclosed according to an implied master protocol which prescribes the example programmed evaluation protocol presented here in minimum sufficient detail to illustrate the essential functionality of the invention.

The system is applicable in numerous credential evaluation scenarios commonly in conjunction with an associated transaction. Embodiments of the system may operate in concert with transaction terminals in use at a point of evaluation implementing an interlock mechanism (i.e. an electrical approval signal generated by the evaluation station and received by the terminal) which allows the system to control disposition of a transaction. Alternately, embodiments of the system may receive signals and data from a transaction terminal and automatically complete a transaction initiated by the terminal. Additionally, embodiments of the system may be incorporated directly into and operate in close interaction with other systems which require the presentation and successful evaluation of credentials for the operation of the system.

The invention is disclosed herein as a transaction authorization system as may be employed in the context of a retail tobacco sales scenario. In this reference scenario the disclosed system employs OFR biometrics in conjunction with OCR technology implementing the most complex of the presently envisioned embodiments.

The system employs databases resident within storage at the point of evaluation. This feature of the system reduces and is ultimately intended to eliminate the necessity for the system to communicate with a remote database server in the course of an evaluation. Event databases contain records of the local system operation including the results of evaluation and transaction events. Reference databases contain records of reference information from numerous credential issuers. In order to maintain the shortest possible evaluation time the system implements means for reducing the size of the reference databases tailoring them to the locale and application of the system.

Figure 1:
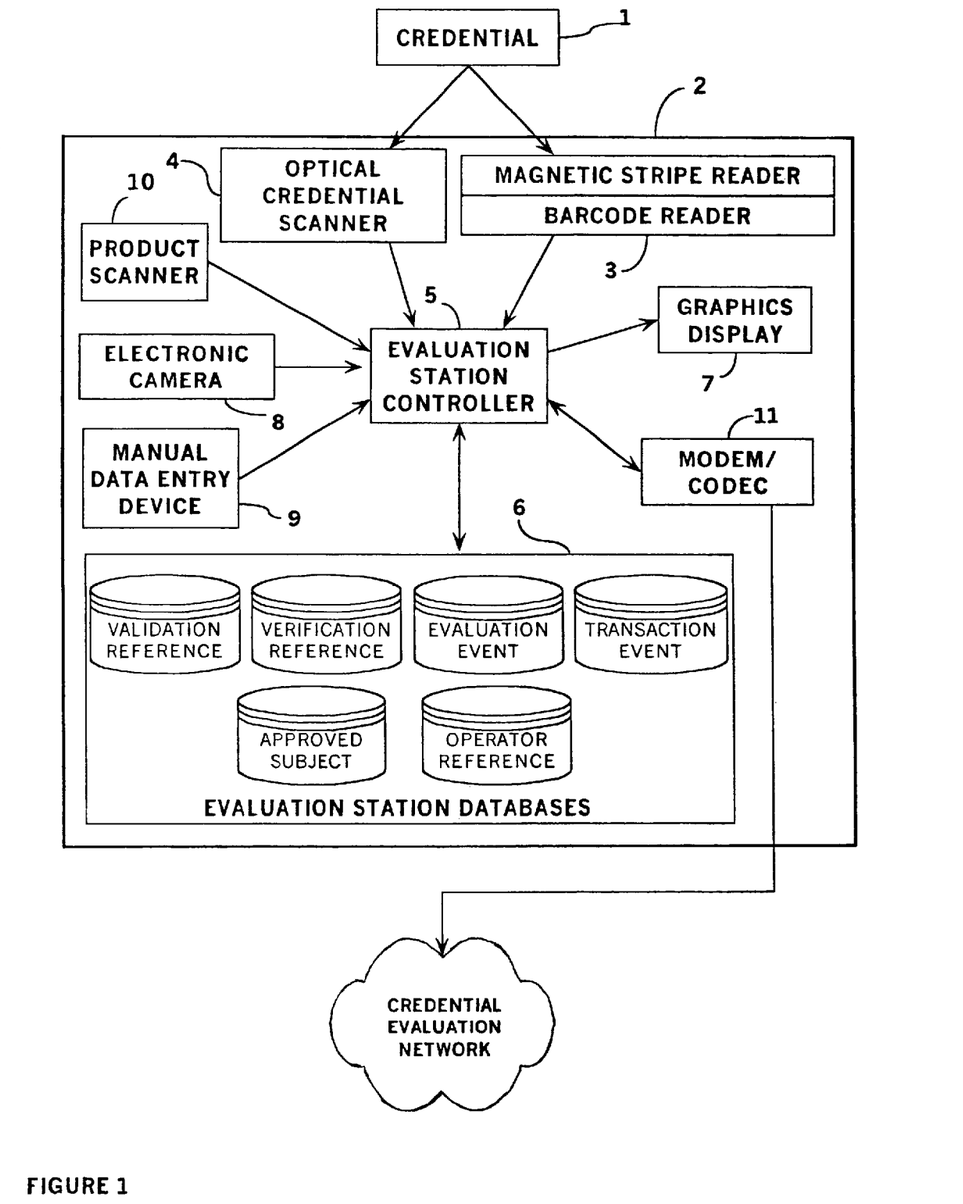
FIG. 1 is a block diagram depicting the hardware modules and an exemplary database configuration of an evaluation station. Different embodiments of the invention may include some or all of the various modules or alternate or additional modules as an evaluation scenario dictates.
Figure 2A:
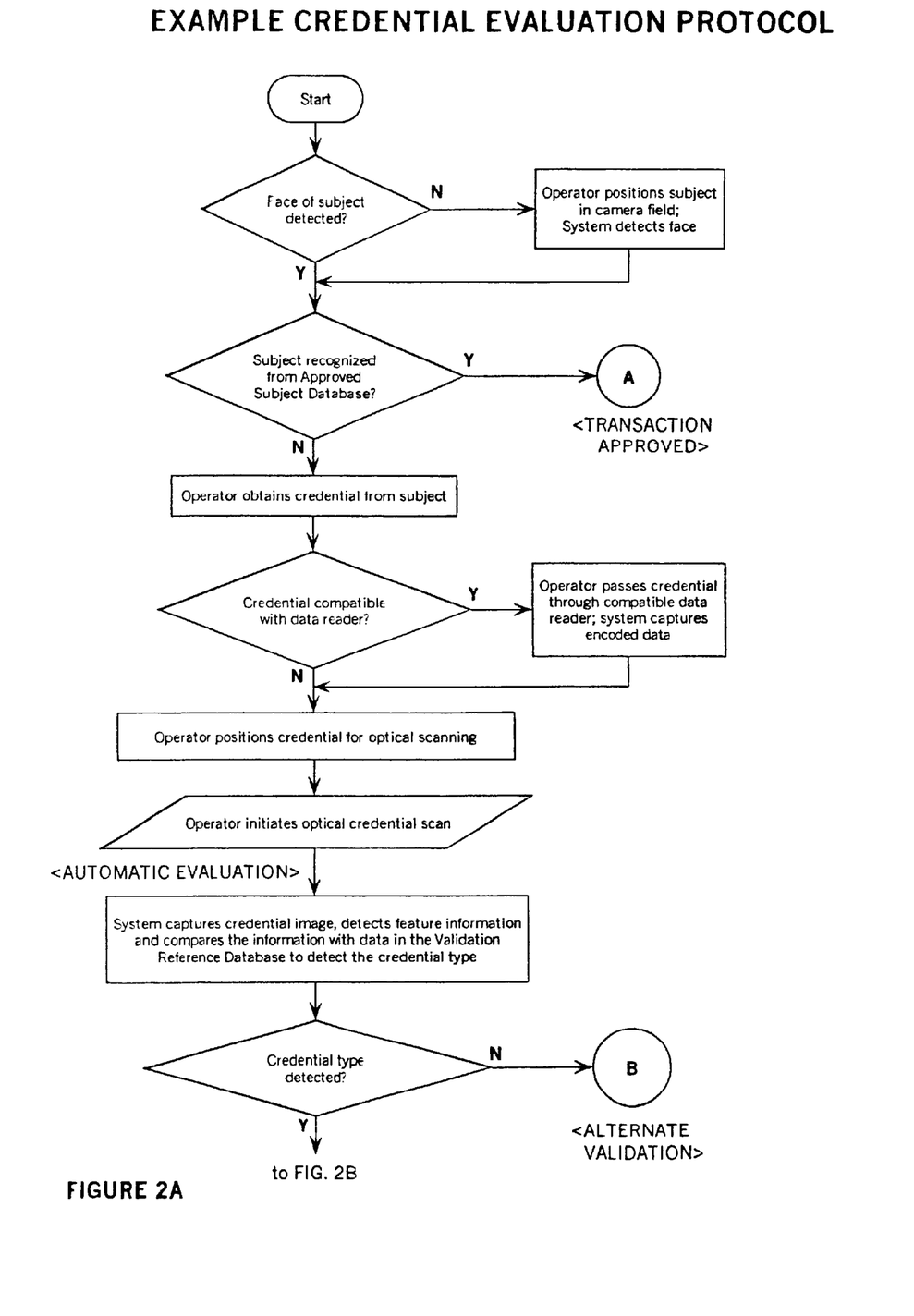
FIGS. 2A through 2D form a flow diagram depicting an exemplary protocol for a reference evaluation event employing the invention as configured according to FIG. 1.
Figure 2B:
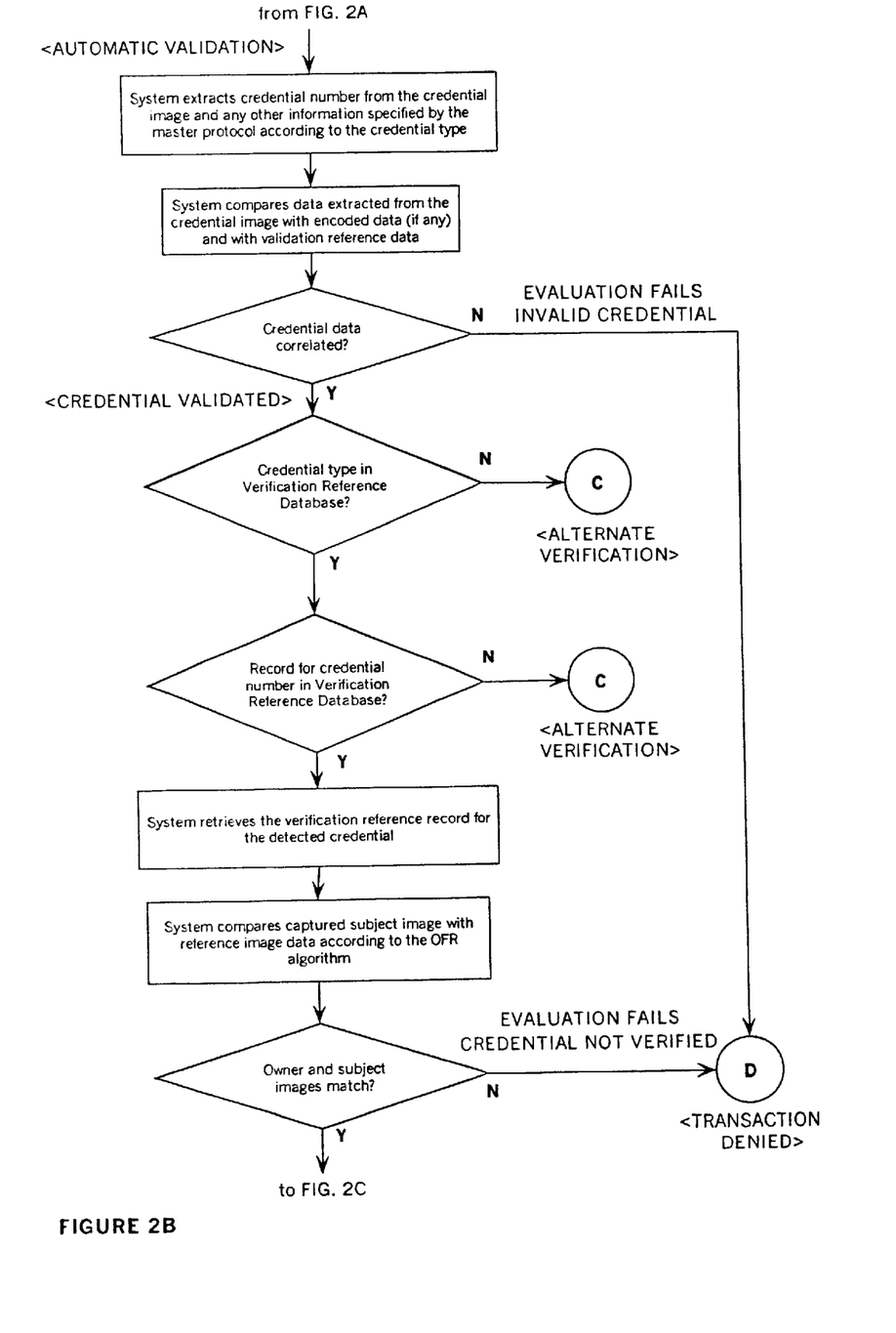
Figure 2C:
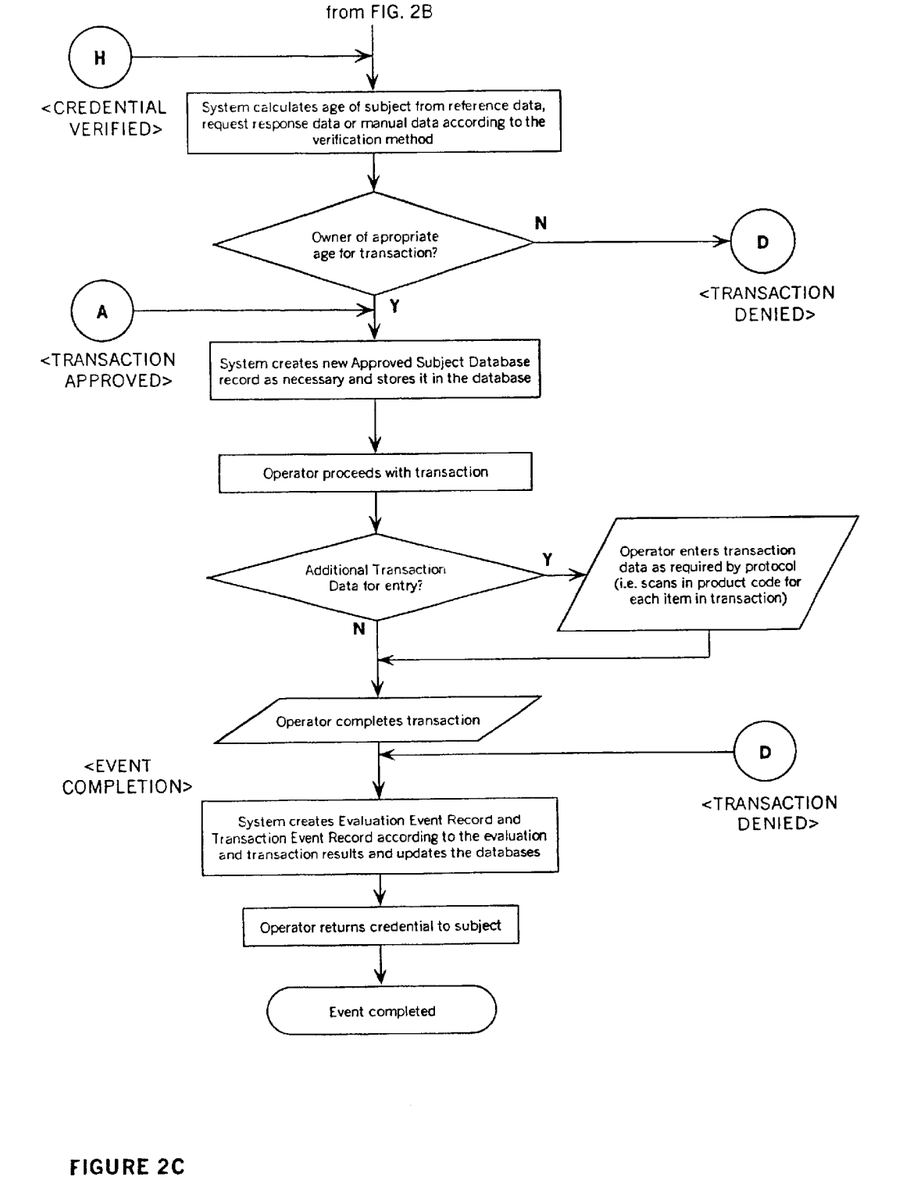
Figure 2D:
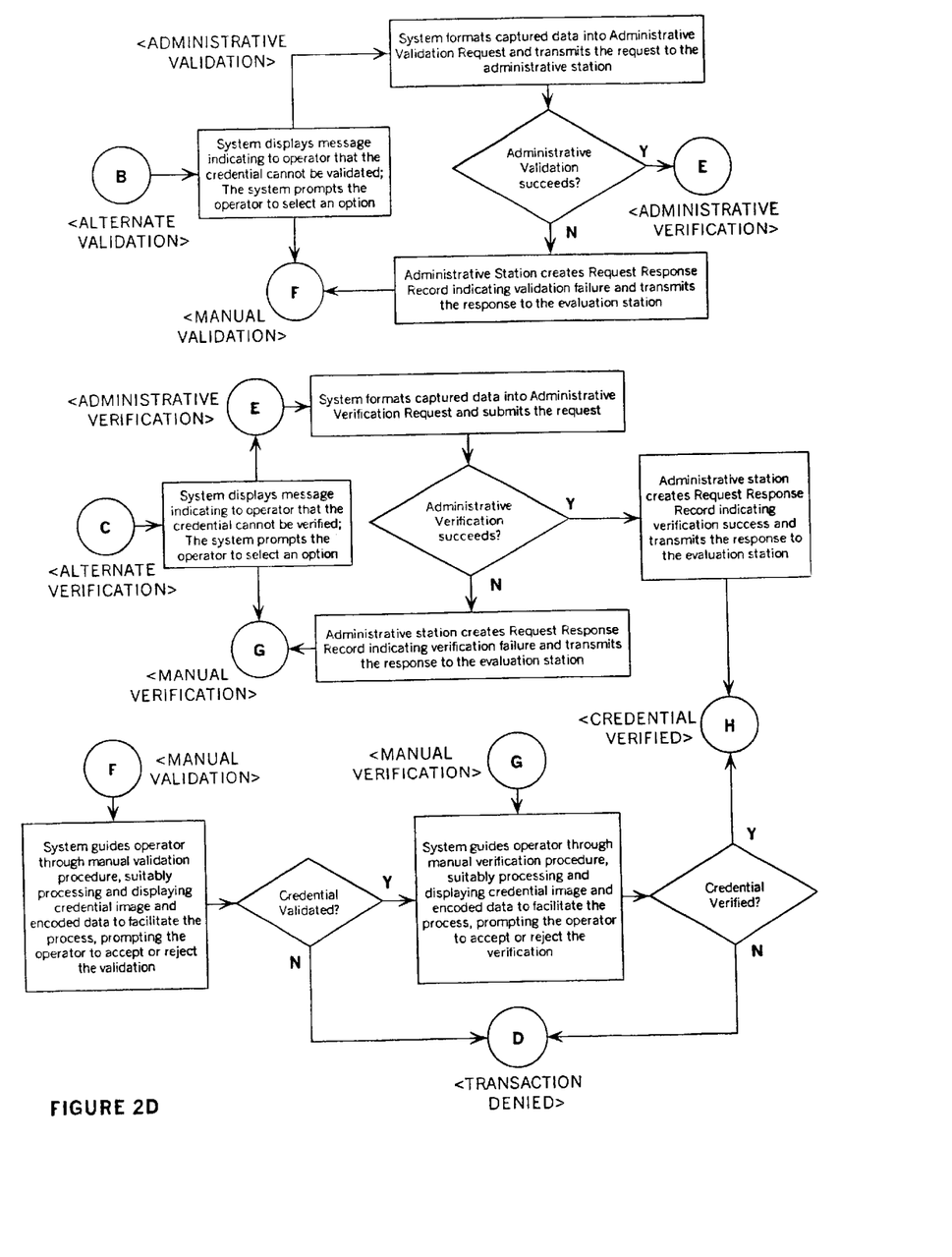

For the example protocol the databases employed are as shown in FIG. 1. The records in the various databases contain information as depicted in the following tables. This description assumes the applicability of prior art for detecting, generating, accessing and comparing the types of data items depicted. A protocol employed in a real scenario may specify more or fewer databases, may name them differently and may specify different data to be stored in different formats with different levels of encoding, encryption and compression.

DATABASE TABLES

Validation Reference Database credential type code
count of features catalogued for the credential type
list of catalogued features describing the features in coded form
count of catalogued features for reference in the course of manual validation
list of catalogued features for reference in the course of manual validation

DATABASE TABLES (continued)

Verification Reference Database credential number (used as the key)
date of birth text string
last name text string
first name text string
count of biometric data elements
set of biometric data element descriptors
set of biometric data elements Evaluation Event Database evaluation event number (used as key)
evaluation event date text string (used as key)
evaluation event time text string (used as key)
count of evaluation event procedures
list of evaluation event procedure results
event disposition text string
verified credential type code
credential number
credential image item
subject image item
operator number Transaction Event Database transaction event number (used as key)
transaction event date text string (used as key)
transaction event time text string (used as key)
associated evaluation event number
count of product information items
list of product information items Approved Subject Database subject number
subject date of birth text string
subject last name text string
subject first name text string
identifying biometric data element descriptor
identifying biometric data element (used as key)

Operator Reference operator number
operator last name text string
operator first name text string
identifying biometric data element descriptor
identifying biometric data element (used as key)

The system anticipates presentation of various types of fraudulent credentials in the reference scenario. Common practice generally recognizes at least three types of fraudulent credential:

1) Counterfeit: completely contrived, different from any actual valid credential, designed merely to appear valid.
2) Altered: additions and changes made to an actual, valid credential.
3) Forged: more extensive altering with counterfeit or forged elements.

The general case is recognized as that of a credential altered to represent the age of its presenter as older than in fact. Embodiments of the system, depending on the nature and extent of cooperation between the credential evaluating entity and credential issuing agencies, may recognize additional forms of fraudulent credential and implement protocols for detecting them. Evaluating entities define the protocol for operator action in the event that the system detects a fraudulent credential or in the event that validation otherwise fails.

The disclosed system, implemented for evaluating credentials of a hypothetical type incorporating photographic and text information and on which are normally compatibly encoded the credential number and the date of birth of the individual identified by the credential, and for which the system maintains sufficiently configured reference databases, provides a method for automatically detecting, for instance, 1) authentic credential with altered date of birth text
2) authentic credential with altered owner image
3) authentic credential with altered encoded data
4) forged credential of known issuer which does not sufficiently match the official format
5) forged credential of known issuer which displays a credential number which does not match the encoded credential number
6) authentic or counterfeit credential of a disallowed known issuer or format The disclosed system comprises any number of evaluation stations each capable of communicating over an associated Credential Evaluation Network. A Credential Evaluation Network comprises a number of evaluation stations operating at evaluation points within an administrative domain and a single administrative station operating at a central administrative site, to which they are logically assigned and with which they communicate via appropriate secure means. Administrative domains are combined to create an extended Credential Evaluation Network comprising a number of administrative stations communicating with each other and with external systems via appropriate secure means sharing computing and reference resources.

System functions are distributed between evaluation stations and administrative stations according to a master evaluation protocol reflecting the supported credential types and any other requirements of the evaluating entity for the administrative domain. The system attempts to maintain as much functionality as possible at the evaluation stations as is consistent with security and performance considerations.

The system is designed to automatically execute a programmed evaluation protocol for validating and verifying a credential presented. However, the invention accommodates the likelihood that it will be incapable of automatically evaluating some credentials presented. The system implements a manual evaluation procedure as part of the programmed evaluation protocol which applies the imaging, processing and display capabilities of the evaluation station to assist the operator in the manual validation and verification of a credential. The system employs an operator interface and input mechanism optimized for facilitating and enhancing the accuracy and reliability of the manual evaluation procedure.

The evaluation station supports the objective of automatically monitoring compliance with an explicit protocol for evaluating credentials by creating database records reflecting the results of the actions performed in the course of executing the programmed evaluation protocol. The system records appropriately compressed and otherwise fully processed versions of data collected by the system in the course of automatic evaluations as well as the operator's identification number and the operator's responses to system prompts along with information identifying the particular evaluation event. The system records raw or minimally processed credential image and presenter biometric data collected by the system in the course of manual evaluations along with the information identifying the evaluation event and the operator.

The system employs all available and appropriate means in order to maintain security and privacy. All databases are accessed and stored in secure manners. The system is designed so that no operator or other party accessing the system at an evaluation station shall have the ability to query any system databases outside of the context of an evaluation event. All aggregate system reporting and management functions are normally carried out by duly identified authorized individuals at administrative stations only.

Administrative stations maintain supersets of the reference data resident at their associated evaluation stations as well as a means for securely accessing external reference databases. Also, upon request by an evaluation stations, administrative stations perform the credential validation and verification functions using their expanded reference databases or the capabilities provided by an Expanded Credential Evaluation Network. The administrative station attempts to perform the identical function as the evaluation station and returns the result to the evaluation station according to the programmed evaluation protocol.

A primary function of administrative stations is to process Administrative Validation Requests and Administrative Verification Requests issued by evaluation stations.

Among the functions of the administrative station is maintenance of the validity of the evaluation station reference databases, adding, deleting and updating records as necessary. Administrative stations control the configuration and normal operation of evaluation station by periodically establishing a maintenance connection to the evaluation station and performing all necessary maintenance functions including protocol installation, software updates and system status monitoring.

The administrative station performs all system-wide auditing functions querying, pruning and otherwise maintaining the event databases on the evaluation stations. The administrative station provides a means by which event records generated by an evaluation station can be manually or automatically reviewed. The administrative station periodically creates reports based on data in the event databases as specified by the evaluating agency according to the master evaluation protocol.

Referring first to FIG. 1 an evaluation station of the invention is disclosed. The physical form of the evaluation station (2) is dictated by design considerations variously comprising some or all of the identified components internally or peripherally. The evaluation station is based on an Evaluation Station Controller (5) which controls all evaluation station functions. The controller conforms to appropriate microcomputer hardware and software architectures providing standard interfaces for connection to and control of the components and peripheral devices.

The evaluation station also comprises high capacity non-volatile storage (6) used for the various databases employed by the system. The reference databases are optimized in such a way as to minimize the amount of processing to be done by the evaluation station in the evaluation process. The databases are optimized for the biometric system in use, the evaluation protocol developed by the evaluating entity and total available database storage. The initial database configuration is tailored for the most likely local credential issuer(s) for the administrative domain.

The evaluation station comprises data communications modems and/or codecs or other communications hardware (11) effecting the physical interface to the selected network medium providing a secure communications link to the administrative station and the Credential Evaluation Network.

The evaluation station in the reference scenario captures an image of the credential presenter with an electronic camera (8) utilizing integrated video digitization and capture hardware features. The evaluation station also comprises a mechanism for capturing an optical image (4) of the presented credential (1) and mechanisms for capturing encoded data (3) embedded within credentials of compatible type. Additionally, the evaluation station provides suitably flexible means for allowing operator input of alphanumeric data (9), signals or other responses to system prompts as well as encoded product or other transaction data (10). All user interface features and other displayable data is presented on the graphics display (7).

Referring now to FIGS. 2A–2D an example programmed evaluation protocol directed to the reference scenario is described illustrating one potential embodiment of the invention.

The disclosed evaluation protocol comprises automatic evaluation and manual evaluation procedures. The evaluation procedures comprise a validation procedure and a verification procedure.

The system attempts to automatically evaluate a presented credential and, if successful, automatically verify that the presenter is the individual identified by the credential utilizing the local resources of the evaluation station. Should the evaluation station fail to automatically validate or verify the credential it proceeds with an appropriate alternate evaluation procedure comprising an automatic procedure performed by the administrative station or a manual procedure guiding the operator and documenting the operation.

Automatic procedures can be performed by an administrative station, upon request by an evaluation station, in response to the receipt of an Administrative Validation Request or Administrative Verification Request. In response to such requests, an administrative station will attempt to perform an automatic validation or an automatic verification or both in a manner identical to that employed by the evaluation station referring instead to alternate Credential Evaluation Network databases. Upon completing the evaluation attempt the administrative station creates an Administrative Request Response indicating the outcome of the administrative evaluation and transmits it to the evaluation station.

Specific protocols implemented in the field may vary significantly from that disclosed here depending on details of system configuration, reference data availability and other implementation considerations.

The example protocol assumes the prior configuration of the evaluation station and installation of the protocol and the databases called for by the protocol.

The protocol commences with the evaluation station in an idle state, processing the video input stream generated by the electronic camera and analyzing it to detect any faces present according to the implemented OFR algorithm.

EXAMPLE CREDENTIAL EVALUATION PROTOCOL

Upon commencing a tobacco sales transaction the clerk (operator) will first observe the system graphics display to determine if the system has detected the face of the prospective purchaser (subject). If the system is displaying the subject's face then the operator signals the system to accept the displayed face and initiate evaluation.

If the system has not detected the subject's face the operator positions the subject in the field of the system camera and adjusts the camera's zoom, pan and focus as necessary until the system detects the subject's face. Once the face is detected the operator signals the system to accept the displayed face and initiate evaluation.

The system employs features of the OFR software to compare the subject's face to faces as stored in the Approved Subject Database attempting to recognize the subject. If the system finds a matching face in the Approved Subject Database, the subject is recognized and the system automatically approves the transaction and continues executing the protocol at <TRANSACTION APPROVED>.

If the subject is not recognized from the Approved Subject Database the system prompts the operator to obtain the subject's credential.

The operator passes the credential through a data reader according to its observed type and compatibility. The operator signals the system to indicate completion of the reading operation.

The system prompts the operator to position the credential for optical scanning. The operator positions the credential as prescribed and signals the system that the credential is prepared for scanning.

<AUTOMATIC EVALUATION>

The system captures an image of the credential and uses image processing and OCR software algorithms to detect the features of the presented credential and compare the detected features of the presented credential to features of credentials as stored in the Validation Reference Database.

If the system finds a match for the credential type in the Validation Reference Database the credential is recognized and the system continues executing the protocol at <AUTOMATIC VALIDATION>.

If the system does not recognize the credential type the evaluation station cannot perform an automatic validation or verification and the system continues executing the protocol at <ALTERNATE VALIDATION>.

<AUTOMATIC VALIDATION>

Once the system recognizes the credential type of the presented credential it refers to reference data in the Validation Reference Database for the credential type to further analyze the credential image to detect the credential number, the date of birth and the owner photo image. The system employs OCR software algorithms to extract character strings of the data. The system compares the optically detected information with encoded data (if any) and validation reference data to find discrepancies.

If the system detects any discrepancies the credential is declared invalid, the automatic evaluation fails and the system continues executing the protocol at <TRANSACTION DENIED>.

If the system finds no discrepancies the credential is declared valid and the evaluation continues. The system uses the extracted credential type and credential number as indices into the Verification Reference Database.

The system searches the Verification Reference Database for a record corresponding to the detected credential according to the detected credential type and credential number.

If the Verification Reference Database does not contain records for the credentials of the detected type the evaluation station cannot automatically verify the credential and the system continues executing the protocol at <ALTERNATE VERIFICATION>.

If the Verification Reference Database contains records for the detected credential type but does not contain a record for the detected credential number the evaluation station cannot automatically verify the credential and the system continues executing the protocol at <ALTERNATE VERIFICATION>.

The system retrieves the verification reference record for the detected credential and continues executing the protocol at <AUTOMATIC VERIFICATION>.

<AUTOMATIC VERIFICATION>

The system attempts to verify that the captured image of the subject matches the reference image of the individual identified by the credential. The verification reference record contains data extracted from the image of the credential owner on file with the credential issuer. The system processes the captured image of the subject using the OFR software algorithm transforming the image to the proper format for comparison with the image data contained in the verification reference record. The system compares the presenter data with the reference data and determines if there is a match.

If the images are determined to not match the system continues executing the protocol at <TRANSACTION DENIED>.

If the images are determined to match the credential is declared verified and the system continues executing the protocol at <CREDENTIAL VERIFIED>.

<CREDENTIAL VERIFIED>

For the example evaluation protocol there are three cases for which the system would continue execution of the protocol at this point.

1) If the credential was automatically verified by the evaluation station the system calculates the age of the subject based on the date of birth contained in the verification reference record.

2) If the credential was automatically verified by the administrative station in response to an Administrative Validation Request or an Administrative Verification Request the system calculates the age of the subject based on the date of birth contained in the Administrative Request Response record.

3) If the credential was manually validated by the evaluation station operator the system calculates the age of the subject based on the date of birth detected from the credential or based on the date of birth as entered by the operator.

The system declares the transaction approved if the calculated age is sufficient for tobacco purchase and continues executing the protocol at <TRANSACTION APPROVED>.

If the calculated age is not sufficient for tobacco purchase the system declares the transaction denied and continues executing the protocol at <TRANSACTION DENIED>.

<TRANSACTION APPROVED>

If the evaluation station Approved Subject Database does not contain a record for the subject the evaluation station creates and stores a new Approved Subject Database record for the subject.

The system prompts the operator to complete the transaction and scan the product(s) purchased or manually enter product information for inclusion in a Transaction Event Record.

The system creates an Evaluation Event Record indicating the success of the evaluation and including the relevant information captured and processed in the course of the evaluation and stores the record in the Evaluation Event Database.

The system creates a Transaction Event Record indicating the relevant details of the transaction and associating the transaction with the Evaluation Event Record and stores the record in the Transaction Event Database. The system continues executing the protocol at <EVENT COMPLETION>.

<TRANSACTION DENIED>

The system creates an Evaluation Event Record indicating the failure of the evaluation, the reason for the failure and including the relevant information captured and processed in the course of the evaluation. The system continues executing the protocol at <EVENT COMPLETION>.

<EVENT COMPLETION>

The operator returns the credential to the subject.

The operator signals the system that the transaction is complete and the system returns to the idle state awaiting the next evaluation event.

<ALTERNATE VALIDATION>

The system prompts the operator to select one of two options:

1) request an administrative validation or
2) perform a manual validation.

If the operator chooses to request an Administrative Validation the evaluation station formats the captured data into an Administrative Validation Request and transmits the request to the administrative station via secure communications interface. The system continues executing the protocol at <ADMINISTRATIVE VALIDATION>.

If the operator chooses to perform a manual validation the system continues executing the protocol at <MANUAL VALIDATION>.

<ADMINISTRATIVE VALIDATION>

Upon receiving an Administrative Validation Request the administrative station performs the programmed validation procedure operating on the data contained in the request.

If the administrative station successfully validates the credential then it creates an Administrative Verification Request and submits it for processing. The system continues execution of the protocol at <ADMINISTRATIVE VERIFICATION>.

If the administrative station fails to validate the credential it returns an Administrative Request Response to the evaluation station indicating validation failure. The system continues executing the protocol at <MANUAL VALIDATION>.

<MANUAL VALIDATION>

The system can implement any manual validation procedure which processes credential and subject images in ways to enhance evaluation operations. For instance, the system may increase contrast of the credential image and enlarge the image to entirely fill the graphics display surface providing a larger-than-life rendition of the credential. The system may display encoded data in proximity to the credential image facilitating comparison with printed information.

The system renders the credential image full-screen on the Graphics Display with various detected regions outlined or otherwise highlighted.

The system prompts the operator to select the region with the photo image.

The system prompts the operator to select the region with the date of birth.

The system prompts the operator to observe particular aspects of the credential format and appearance.

The system prompts the operator to declare the credential valid or invalid.

If the operator declares the credential invalid the system continues executing the protocol at <TRANSACTION DENIED>.

If the operator declares the credential valid the system continues execution of the protocol at <MANUAL VERIFICATION>.

<ALTERNATE VERIFICATION>

The system prompts the operator to select one of two options:
1) request an administrative verification or
2) perform a manual verification.

If the operator chooses to request an Administrative Verification the evaluation station formats the captured data into a Administrative Verification Request and transmits the request to the administrative station via secure communications interface. The system continues executing the protocol at <ADMINISTRATIVE VERIFICATION>.

If the operator chooses to perform a manual verification the system continues executing the protocol at <MANUAL VERIFICATION>.

<ADMINISTRATIVE VERIFICATION>

Upon receiving an Administrative Verification Request the administrative station performs the programmed verification procedure operating on the data sent as part of the request.

If the administrative station successfully verifies the credential then it returns an Administrative Request Response to the evaluation station indicating verification success and including the necessary data for creating new Evaluation Event and Transaction Event records. The system continues executing the protocol at <CREDENTIAL VERIFIED>.

If the administrative station fails to verify the credential it returns an Administrative Request Response to the evaluation station indicating verification failure. The system continues execution of the protocol at <MANUAL VERIFICATION>.

<MANUAL VERIFICATION>

The system can implement any manual verification procedure which processes credential and subject images in ways to enhance evaluation operations. The system may prompt the operator to select the photo from the credential image and then enlarge the photo to optimal size rendering the photo image side-by-side with the captured subject image on the graphics display. The system may employ the OFR algorithm to analyze the image appearing on the credential and compare the image to the captured image of the subject.

The system processes the subject image and the region of the credential image selected by the operator rendering them at equal size side-by-side on the graphics display.

The system prompts the operator to declare the displayed images as matching or not.

If the operator declares a match then the credential is verified and the system continues executing the protocol at <CREDENTIAL VERIFIED>.

If the operator declares no match the system continues executing the protocol at <TRANSACTION DENIED>.

The disclosed system employs the features for credential evaluation to provide a mechanism for registering and selecting operators of the system. Particular master evaluation protocols may require that the operator responsible for a particular evaluation be documented. The system provides a means by which approved operators are identified to the system and a means for selecting the operator of record for association with subsequent evaluation events.

<OPERATOR REGISTRATION>

An authorized supervising operator enables administrative mode of the evaluation station using a code or key according to the security system employed.

The supervisor initiates the operator registration procedure, entering operator data as prompted for by the system according to the programmed security protocol.

The system prompts the supervisor to position the new operator in the field of the system camera.

The system uses the same OFR algorithms as used in the evaluation process to create a reference record for the new operator.

<OPERATOR SELECTION>

An authorized supervising operator enables administrative mode of the evaluation station using a code or key according to the security system employed.

The operator stands in field of system camera until the system indicates that a face has been recognized.

The system scans the Operator Reference Database searching for a match. If a match is found the operator is recognized and the system is updated adjusting its recording protocol to reflect the new operator.

While certain novel features of this invention have been shown and described, it will be understood that various omissions, substitutions and changes in the forms and details of the device illustrated and in its operation can be made by those skilled in the art without departing from the spirit of the invention.

What is claimed is:

1. A transaction authorization system for determining whether an individual is authorized to perform a transaction, the system comprising:

a first data acquisition means, for use in acquiring a first set of document-specific data characteristic of a document presented by an individual seeking authorization;

a second data acquisition means, for use in acquiring a first set of person-specific biometric data characteristic of an individual seeking authorization;

a first database of data records where each of said data records includes a second set of document-specific data characteristic of a unique type of valid document;

a first data processing means for determining whether the first set of document-specific data corresponds to the second set of document-specific data from any data record in the first database and therefore whether the document presented is valid;

a first set of rules for validating a presented document by determining whether the acquired first set of document-specific data corresponds to the second set of document-specific data from any record in the first database, where the first data processing means applies the first set of rules to the acquired first set of document-specific data and to the second set of document-specific data in the data records in the first database;

a second database of data records, where each of said data records corresponds to a unique document, each record including a third set of document-specific data, a first set of person-specific biographical data and further including a second set of person-specific biometric data and where both sets of person-specific data are characteristic of the same person;

a second data processing means for selecting a data record in the second database corresponding to the first set of document-specific data;

a third data processing means for determining whether the first set of person-specific biometric data corresponds to the second set of person-specific biometric data from a data record in the second database and therefore whether the record corresponds to an individual seeking authorization;

a fourth data processing means for determining whether the first set of person-specific biographical data from a record in the second database indicates that the individual characterized by the record is eligible to perform a transaction; and a device for indicating whether a transaction is authorized.

2. The transaction authorization system of claim 1, further comprising:

a second set of rules for determining whether the presented document corresponds to any single record in the second database, where the second data processing means applies the second set of rules to at least one data element of the acquired first set of document-specific data and to at least one of the elements of the second set of document-specific data contained in any of the data records in the second database;

a third set of rules for verifying a presented document by determining whether the second set of person-specific biometric data from a data record in the second database corresponding to the presented document corresponds to the acquired first set of person-specific biometric data, thereby confirming that the individual seeking authorization is the person corresponding to the presented document, where the third data processing means applies the third set of rules to the acquired first set of person-specific biometric data and to the second sets of person-specific biometric data in the data records in the second database; and a fourth set of rules for authorizing a transaction by determining whether the first set of person-specific biographical data from a data record in the second database corresponding to the presented document indicates the presenter's eligibility to perform the transaction, where the fourth data processing means applies the fourth set of rules to the set of person-specific biographical data from the data record in the second database corresponding to the individual seeking authorization.

3. The transaction authorization system of claim 1, further comprising:

a graphics display device as the device for indicating transaction authorization where the display device is also used to present graphical information to an operator of the transaction authorization system; and a manual alphanumeric data input device for use by an operator of the transaction authorization system for entering data required by the system.

4. The transaction authorization system of claim 3, further comprising:

a fifth set of rules by which an operator of the transaction authorization system is guided in a manual procedure performed by the operator for determining whether a transaction is authorized, said set of rules also determining the criteria for invoking the manual procedure; and a fifth data processing means which employs the graphics display device and the alphanumeric data input device according to the third set of rules.

5. The transaction authorization system of claim 1, further comprising:

a means for securing and limiting access to the databases comprised by the transaction authorization system.

6. The transaction authorization system of claim 1, further comprising:

a plurality of transaction authorization systems constituting an evaluation network, where the transaction authorization systems are located at evaluation points within an evaluation domain;

an administrative station comprising a communication means by which the administrative station communicates with the transaction authorization systems for the purpose of controlling and monitoring the operation of the transaction authorization systems; and a data processing means by which the administrative station controls access to the databases comprised by the transaction authorization systems with which the administrative station communicates.

7. The transaction authorization system of claim 6, where:

the communication means by which the administrative system communicates with said transaction authorization systems is secure.

8. The transaction authorization system of claim 6, further comprising:

a data processing means for creating reports detailing or summarizing the operations of the transaction authorization systems.

9. The transaction authorization system of claim 1, where the first data acquisition means comprises:

an optical document scanner;

an image processing means for processing an optical image of a document which detects data imprinted on the document; and a means for detecting data encoded on or into on the document.

10. The transaction authorization system of claim 1, where:

the second data acquisition means comprises an electronic camera which is used to acquire an optical image of the face of an individual seeking authorization and an associated data processing means implementing an optical facial recognition algorithm for processing an optical image of a face to create a set of parameters uniquely corresponding to the face, said parameters serving as the first set of person-specific biometric data; and the second set of person-specific biometric data included in each of the data records in the second database are parameters created by a data processing means implementing the identical optical facial recognition algorithm implemented by the second data acquisition means, said data processing means having processed an official optical image of the face of the person corresponding to the data record.

11. The transaction authorization system of claim 1, further comprising:

a third database of data records, where each of said data records includes a third set of person-specific biometric data characterizing an individual who has previously been authorized for a transaction; and a sixth data processing means for determining whether the first set of person-specific biometric data corresponds to the third set of person-specific biometric data from a data record in the third database and therefore whether the record corresponds to an individual who is automatically authorized to perform a transaction without presenting a document.

12. The transaction authorization system of claim 1, further comprising:
   a fourth database of data records, where each of said data records includes a fourth set of person-specific biometric data characterizing an individual who has been registered as an operator of the transaction authorization system;
   a seventh data processing means for determining whether a fifth set of person-specific biometric data acquired through the second data acquisition means corresponds to a fourth set of person-specific biometric data from a data record in the fourth database and therefore whether the record corresponds to an individual who is automatically authorized to operate the transaction authorization system; and
   an eighth data processing means for associating the operator of the transaction authorization system with authorization attempts and transactions authorized by the system.

13. The transaction authorization system of claim 1, where the individual seeking authorization acts as the operator of the system.

14. The transaction authorization system of claim 13, where:
   the device indicating authorization is an electronic signaling circuit which generates a signal detectable by another system.

15. The transaction authorization system of claim 1, further comprising:
   a fifth database of data records, where each of said data records includes information characterizing an instance of the performance of the transaction authorization method; and
   a data processing means for generating records for inclusion in the fifth database.

16. The transaction authorization system of claim 1, further comprising:
   a sixth database of data records, where each of said data records includes information characterizing a transaction authorized by the system; and
   a data processing means for generating records for inclusion in the sixth database.

17. A method for verifying whether an individual seeking authorization to perform a transaction and presenting a document as a condition of the authorization is authorized to perform the transaction, the method comprising:
   acquiring a first set of biometric data characteristic of the individual directly from the individual;
   detecting whether the first set of biometric data corresponds with any one of a plurality of sets of biometric data, each set of biometric data corresponding to an individual who can be automatically authorized to perform the transaction;
   acquiring a first set of document-specific data from a document presented by the individual;
   applying a first set of rules to the first Set of document-specific data to identify one of a plurality of sets of document-specific data where each set of document-specific data corresponds to a different type of valid document, thereby detecting the type of document being presented for validation;
   acquiring a first set of person-specific data from a document presented by the individual, where the first set of person-specific data comprises a plurality of data elements;
   using at least one data element of the first set of person-specific data to access one of a plurality of databases of valid person-specific document records, where the particular database of valid person-specific document records is determined by the type of document being presented for validation, where the database of person-specific document records includes a separate document record for each valid document, where each valid document record includes a second set of person-specific data about a single individual, and further includes pre-established biometric data, where the result of e access to the database of valid document records results in a retrieved document record;
   comparing the pre-established biometric data of the retrieved document record with the first set of acquired biometric data to determine if the retrieved document record, and the document presented by the document presenter, corresponds to the document presenter; and
   applying a second set of rules to the person-specific data of the retrieved document record to determine if the document presenter is authorized to perform the transaction.

* * * * *